Aug. 20, 1957 J. C. SCHOLTZ 2,803,063
APPARATUS FOR DETECTING AND MEASURING CLEARANCE
ON RAILWAY EQUIPMENT, LADINGS AND THE LIKE
Filed May 20, 1952 7 Sheets-Sheet 1

INVENTOR.
JOHN C. SCHOLTZ
BY

Aug. 20, 1957 J. C. SCHOLTZ 2,803,063
APPARATUS FOR DETECTING AND MEASURING CLEARANCE
ON RAILWAY EQUIPMENT, LADINGS AND THE LIKE
Filed May 20, 1952 7 Sheets-Sheet 2

INVENTOR.
JOHN C. SCHOLTZ

INVENTOR.
JOHN C. SCHOLTZ

Aug. 20, 1957  J. C. SCHOLTZ  2,803,063
APPARATUS FOR DETECTING AND MEASURING CLEARANCE
ON RAILWAY EQUIPMENT, LADINGS AND THE LIKE
Filed May 20, 1952  7 Sheets-Sheet 5

INVENTOR.
JOHN C. SCHOLTZ

FIG. 17

INVENTOR.
JOHN C. SCHOLTZ

United States Patent Office 2,803,063
Patented Aug. 20, 1957

2,803,063

APPARATUS FOR DETECTING AND MEASURING CLEARANCE ON RAILWAY EQUIPMENT, LADINGS AND THE LIKE

John C. Scholtz, Lakewood, Ohio

Application May 20, 1952, Serial No. 288,816

3 Claims. (Cl. 33—174)

This invention relates to the art of measuring or gauging and the like and has particular reference to the measurement of clearances on railway structures, railway equipment and train ladings.

It is essential in the operation of a railway system to have information concerning the right of way, the clearances in tunnels, the bridge heights, widths and contours, and the disposition and relation to the tracks of obstructions, docks, platforms and other objects on and adjacent to the right of way. Many of the devices envolved to measure railway equipment, ladings and other objects of the character mentioned have been unsatisfactory because of complexity or cost and have been cumbersome in use. Those which are simple and inexpensive are frequently inaccurate or require too much time to obtain the information and measurements desired.

It is therefore one of the principal objects of the present invention to provide an improved accurate measuring or gauging device of low cost and simple construction which eliminates objections to existing devices and overcomes deficiencies in the operating characteristics of earlier instruments, and which can be readily disassembled and reassembled for greater portability. The present device utilizes a main or principal column which is so supported as by means of a base or platform structure as to establish a vertical axis that serves as a reference from which distances and about which angles are measured. A superstructure rotatably mounted on the main column establishes a datum plane from which various levels or vertical distances are measured. Included in the superstructure is an upright rod carried as by a boom at a fixed radius from the reference axis, the rod thus being arranged to generate a right cylindrical surface. An indicator mounted on the rod at a known or predetermined distance from the datum plane can be moved into contact or registry with an object or obstruction to be measured and the location of the latter in relation to the intersection of the reference axis in the datum plane is readily calculated by well known mathematical methods or obtained from tables or curves prepared for use with the device.

In a preferred arrangement the base or platform comprises a wheeled carriage that is built to travel along a railway track so that objects and obstructions to be investigated along the right of way are located with respect to the track. As a specialized version of the invention the main column is mounted on the carriage so that the reference axis is held at the gauge face of one of the rails of the track to facilitate clearance measurements. A still further refinement of this aspect of the invention contemplates location of the upright rod on the boom at a distance from the swing or reference axis substantially half the track gauge so that the cylindrical surface generated by the rod is tangent to the centerline of the track. By this arrangement the rod can be used for direct measurement of clearances along the track centerline and to simplify these and related measurements the rod is made vertically extensible and contractible. Preferably the rod is mounted on the boom for bodily axial shifting, and suitable indicia are provided to show distances, lengths and angles and the relative position of the rod on the boom.

Measurements from the reference or swing axis to vertical objects and at radii other than that of the extensible rod are made by a laterally extending arm on the rod and by a supplemental vertical element mounted on the arm. The arm is bodily movable with the rod both vertically and rotationally about the reference axis. This lateral arm is longitudinally extensible and contractible and the supplemental vertical element is bodily shiftable along the arm for establishing various radii. The connections of the arm to the rod and of the rod to the boom include suitable indexing means for orienting the arm in the plane of the boom and the main reference axis.

Another object of the invention is to provide an illuminated visual indicator suitable for use on a measuring rod arm or branch and adapted upon minimum deflection automatically to flash a light or give a signal to indicate contact or limit of movement of the arm, branch or other member on which the indicator is mounted relative to an object being measured or gauged.

A still further object of the invention is to provide a measuring or gauging instrument of relatively light weight and of collapsible or take down construction which is adaptable to packaging in a small container or valise for easy transportation to the place of use.

Other objects and advantages pertaining to certain novel features of construction and combinations and arrangements of parts which obtain simplicity and economy in manufacture and operation are apparent in the following detailed description of a measuring device or clearance machine embodying the principles of the present invention. This description is made in connection with the accompanying drawings forming part of the specification.

The clearance machine or measuring device, embodying my invention and described generally, comprises a carriage or substructure C, which constitutes a base or platform, on which is mounted at one side an upright, preferably vertical, column that supports a swingable boom B. On the free end of the boom, in spaced relation to the column 1 is mounted an upright, preferably vertical, support member or rod R which swings with the boom B. The rod axis parallels the swing axis of the boom so that the rod (or its axis) generates a right cylinder centered at the column axis.

Mounted on the upright rod in vertically spaced relation are a plurality of horizontal indicator arms A' and A'' each disposed at a right angle to the rod. Although the drawings show the device with the upper arm A' and the lower arm A'' in place, these arms are removable from the vertical rod R and the device may be used either with one of the arms, both of the arms, or, in certain instances, with neither of the arms, depending upon the particular type and sequence of clearances to be measured.

The device is also shown in position on rails 2 and 3 connected by ties, one of which is indicated at 13 of a conventional railway tract T. Although it is customary to make clearance measurements along a railway right of way in relation to the track gauge, it is to be understood that the device finds numerous other applications and can be conveniently set up in a warehouse or on a dock using conventional means for leveling the carriage C upon the floor. The carriage may also be mounted on temporary or mock-up rails for measuring ladings and clearances in the field. Indicator devices I on the ends of the measuring components show by visual signal the establishment of contact between the device and the object being measured or gauged.

Carriage or substructure

The carriage C comprises a truck 4, having wheels 5 and 6 for riding on one of the rails, say the rail 2 of the track T, and generally horizontal frame members 7, 8 and 9 which extend laterally from spaced parts of the truck in converging relation and are connected together short of the other rail 3 of the track as by plates 10 and 11. One of the frame members, preferably the middle member 8, extends beyond these connecting plates and overlies the rail 3 of the track. An adjustable truck 12 supports this projecting frame member, having a single wheel 14 which rides on the rail 3.

The body of the truck 4 and the middle frame member 8 are formed of square sectioned aluminum tubing, the frame member being abutted against the central portion of the truck body in T relation. A socket structure 15 on the truck receives the end of the frame member 8 in removable relation, transverse pins through the parts being withdrawable to permit facile disassembly of the device.

Figures 9, 10, 11, 12, 14:
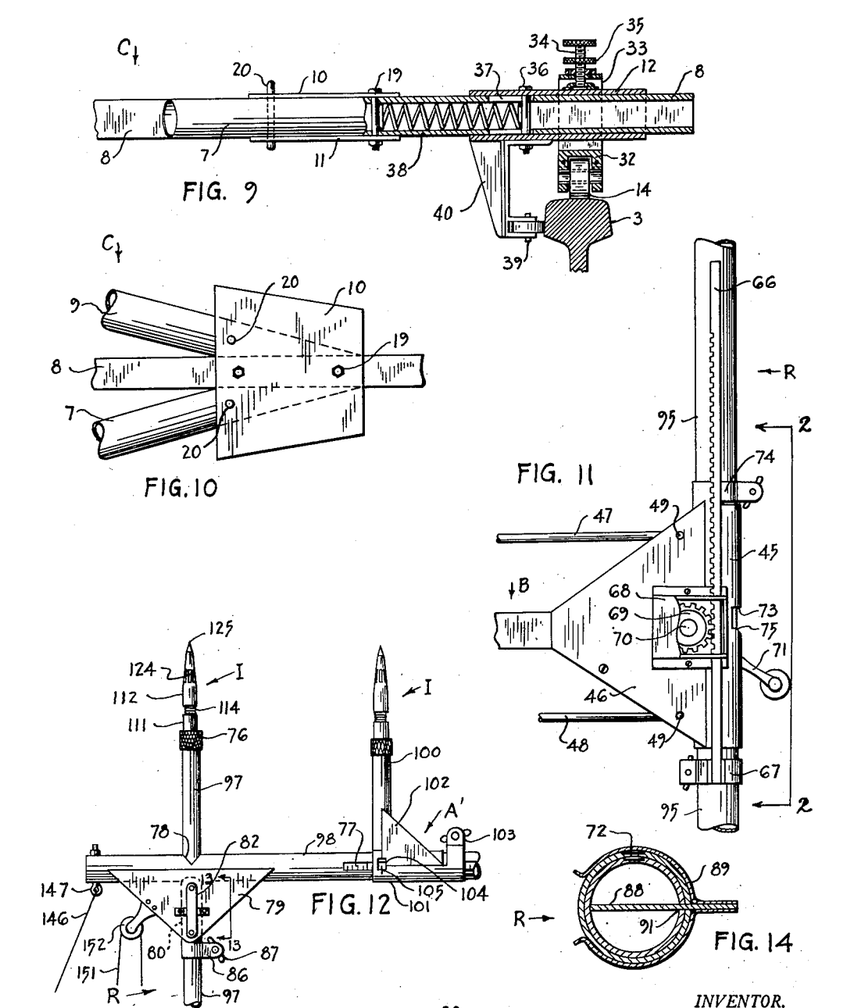
Fig. 9 is a fragmentary sectional detail with parts broken away and removed showing the construction of the right-hand truck or end of the carriage as viewed in Fig. 1, this detail being enlarged with respect to Fig. 1.
Fig. 10 is a fragmentary plan view of a portion of the carriage frame shown in Fig. 9.
Fig. 11 is fragmentary elevational detail of the free end of the boom, partly in section and with parts broken away and removed, this view showing the mechanism for raising and lowering the vertical indicator rod.
Fig. 12 is a fragmentary elevational detail showing the upper end of the vertical indicator rod and the base end of the top horizontal arm.
Fig. 14 is a sectional detail taken transversely through the vertical rod to show the locking and indexing pin, this view being taken substantially along the line of 14—14 of Fig. 18 and enlarged with respect to that figure.

The frame members or struts 7 and 9, herein shown as tubes of light metal such as aluminum, are abutted against the sides of the truck 4 adjacent the ends of the latter, each member being received between a pair of top and bottom plates 16 and 17 extending laterally from the truck. The strut or frame member ends are held by removable pins 18 in the provision of clevis type joints. The attaching plates 10 and 11, shown in plan form in Fig. 10, are secured flatwise against the top and bottom surfaces of the main carriage member 8 as by bolts 19 and confine between them the beveled ends of the circular sectioned struts or frame members 7 and 9. Removable pins 20 extend through aligned openings in the frame members and the retaining plates to hold the parts together and to permit easy disassembly.

Each of the metal frame members 7, 8 and 9 is formed in sections, blocks of insulating material indicated at 21 being interposed between and connecting adjoining sections to prevent the conduction of electrical current from one rail of the track to the other through the substructure frame. These insulating blocks are formed with reduced end portions received snugly and telescopically within the aligned ends of the tubular frame member components. Transverse pins retain the insulating blocks and the frame member components in assembled relation.

At its ends, preferably beyond the plates 16 and 17, to which are attached the frame members 7 and 9, the truck 4 is formed with downwardly opening sockets of square or other non-circular section that receive the correspondingly shaped upper ends of fork blocks 23 for vertical adjustment. The fork blocks retain bushings journaling the axles that carry the carriage supporting wheels 5 and 6. The blocks 23 are held captive in the truck sockets and are vertically adjustable therein as by means of knurled head screws 24 and knurled lock nuts 25. By means of the adjusting screws 24 the ends of the truck 4 can be raised and lowered to level the carriage or substructure, spirit level 28 being provided as an indicator on substructure cross member 26 which extends between the upper ends of uprights 27.

Guide rollers or wheels 30, carried by depending brackets 31 secured on the ends of the truck 4, bear against the inside or gauge faces of the rail 2 and locate the wheels 5 and 6 on the top of the rail.

Figures 1, 2:
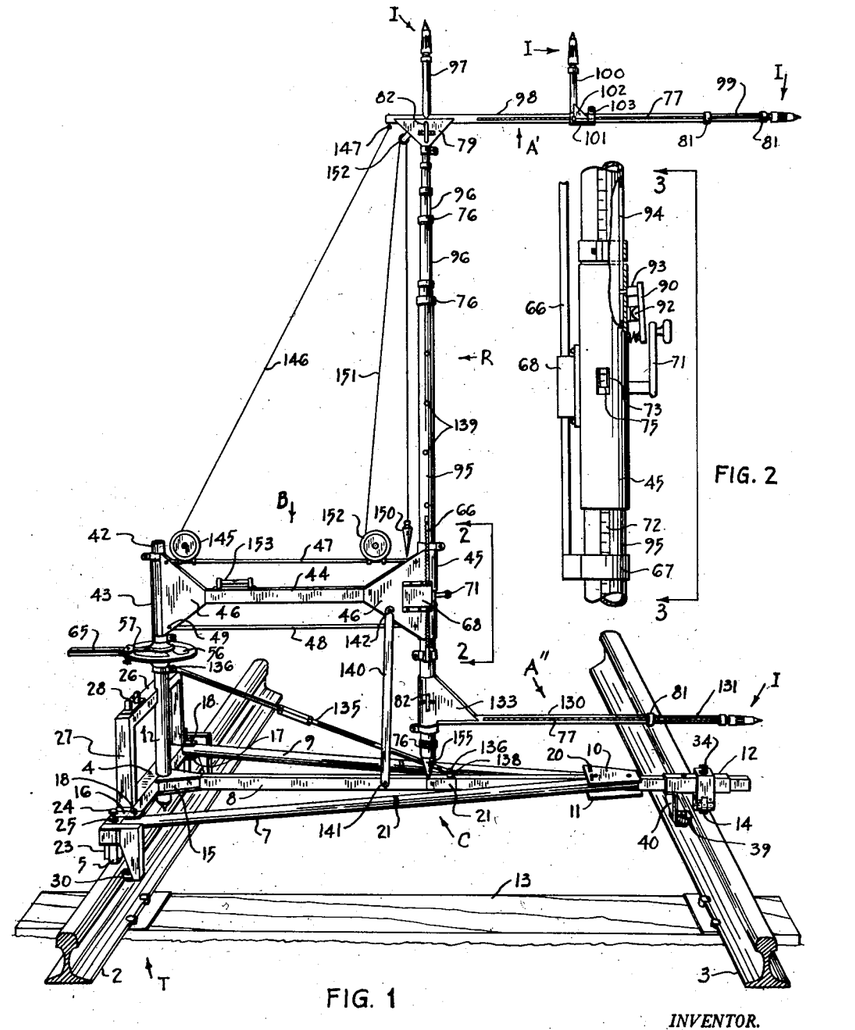
Fig. 1 is a perspective of the clearance machine or device mounted on a section of railway track.
Fig. 2 is an elevational detail, partly in section and with parts broken away and removed, showing the end of the swingable boom, this view being taken substantially on the line indicated at 2—2 of Fig. 1 and enlarged with respect to that figure and indicated also at 2—2 of Fig. 11.

The wheel 14 which supports the right-hand end of the substructure or carriage, as viewed in Fig. 1 and Fig. 9, is mounted on a bushed shaft supported across the bifurcated end of a block 32 secured between leg portions of an inverted U-shaped member that straddles the tubular truck member 12. The sides of the truck member are faced or cut away to provide ways that receive and guide the leg portions of the U-shaped member 33 for vertical sliding movement. This relative movement of the U-shaped member 33 on the truck member 12 is obtained by a knurled head adjusting screw 34 threaded through the U-shaped member and arranged to bear against the top of the truck member 12. A knurled lock nut 35 carried by the screw 34 retains the parts in adjustment, and a circular bearing plate at the bottom end of the screw is held in a ring-shaped retainer secured to the top of the tubular truck member. A bolt 36 extends vertically through the truck member 12 and is received through elongated slots 37 in the square sectioned frame member 8, the slots permitting limited longitudinal sliding movement of the truck on the frame member. A helical coil compression spring 38 received within the frame member 8 between the plate attaching bolt 19 and the truck bolt 36 urges the latter to the right as viewed in Fig. 9. A guide wheel or roller 39 carried by bracket 40 depending from the truck 12 is thus held yieldingly against the inside face of the rail 3. The reaction of the spring 38 also spreads the carriage span, presses the guide wheels or rollers 30 against the rail 2 so that the carriage or substructure of the device is located on the track rails in predetermined position and the truck 4 is retained in constant relation to the inside face or gauge surface of the rail 2. The vertical swing axis of the boom B is disposed at this inside gauge face of the rail 2 and is maintained in such position by the locating guide rollers 30 and 39.

*Column and boom*

The column 1 which supports the boom comprises an upright cylindrical tube which is secured rigidly to the main truck member 4 and to the cross member 26. Extending through the column tube is a post 42 which may be solid or, as shown a tube with plugged ends. The post receives and is embraced by a tubular sleeve 43 which constitutes the turning center of the superstructure boom.

The body 44 of the boom B, herein shown as an aluminium or other light metal tube, desirably of square or other cross-section having parallel sides, extends laterally from the turning sleeve 43 to support a guide sleeve 45 in spaced generally parallel relation to the sleeve 43. The guide sleeve 45 receives the telescoping tubular rod R, the latter being axially adjustable in the sleeve. The ends of the boom body tube 44 abut the sleeves 43 and 45, being contoured to the shape of the latter and secured as by brazing. The connections of the tube ends to the sleeves are reinforced by triangular brace plates 46 arranged in pairs flatwise against the opposite flat side faces of the boom body. The edges of the brace plates are permanently secured to the tubes 43 and 45 as by welding or brazing which is used generally for making the permanent connections in the present device.

Additional strength is imparted to the boom by top and bottom horizontal tie rods 47 and 48 which parallel the body tube 44, the ends of the rods being secured to pins 49 held between the brace plate pairs.

Figures 3, 4:
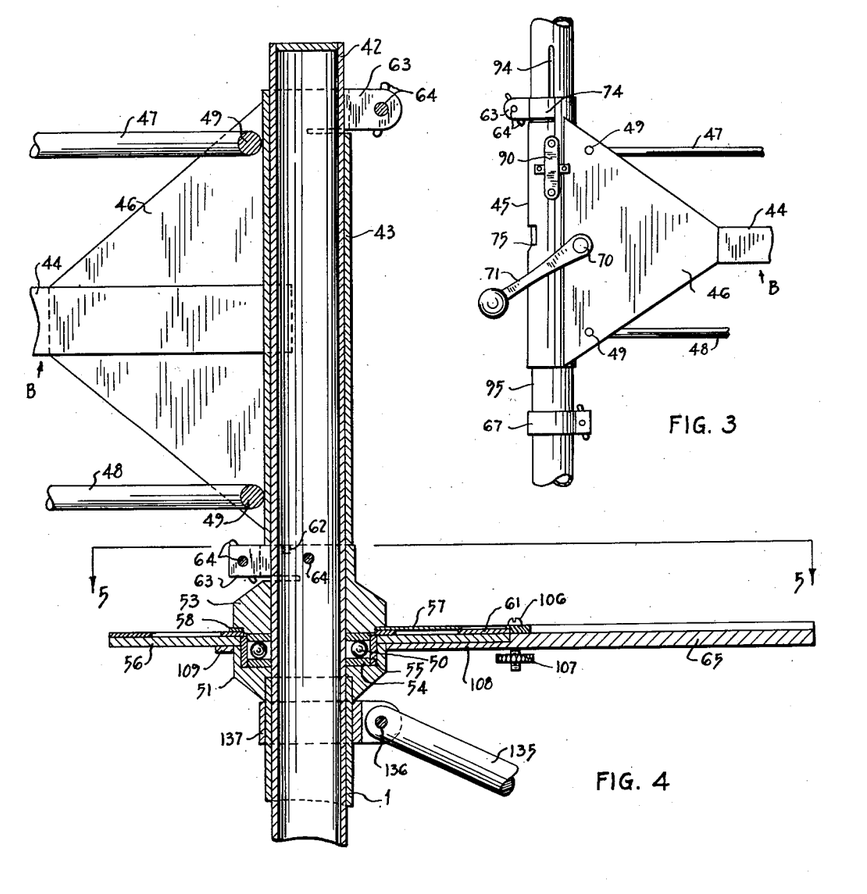
Fig. 3 is elevational detail taken substantially on the line 3—3 of Fig. 2.
Fig. 4 is a vertical sectional detail through the main column showing the connection of the boom to the column and the construction of the protractor, this view being enlarged with respect to Fig. 1.

A bearing assembly incorporated in the column structure carries the weight of the boom B and other parts of the superstructure, the bearing comprising a series of ball bearings 50 (Fig. 4) held in the usual retainer. The retainer and balls are caged in a circular channel formed in the upper face of a circular block 51 received over the tubular column 1, the cap block 51 being counterbored to provide an internal shoulder which rests on the upper end of the column 1. The post 42 guided in the column 1, is received through the central bore in the cap block 51 and a circular bearing block 53, similar in shape to the cap block 51 is also formed with a central bore to receive the post 42. The bearing block has an annular bottom face that rests on the bearing 50 so that the block and the superstructure carried thereby turn freely relative to the substructure. Circular washers 54 of wear resistant metal are interposed between the ball bearings and the confronting faces of the blocks 51 and 53 to withstand the concentrated pressure of the ball bearings and to thereby permit the use of softer, relatively light weight metals such as aluminium and magnesium for the blocks 51 and 53. A wear resistant ring in the form of a stub tube 55 is received and rigidly secured in the circular bearing recess in the top of the cap member 51, the ring 55 projecting above the upper edge of the cap member and receiving thereabout a horizontally disposed circular platform 56 which is thus located and centered on the column axis, the platform being centrally apertured to receive the stub tube 55 and being rigidly secured to the latter. Screws or other fastening means may be used to secure the platform 56 to the cap member 51 to hold the platform against turning, the cap member 51 being welded or otherwise secured against turning on the tubular column 1.

An indicator arm 57 arranged to sweep over the upwardly directed face 61 of a protractor scale is formed as an integral lateral extension on a flat ring 58 that seats in a circular rabbet formed about the periphery of the bottom face of the bearing block 53. Screws or other fasteners, not shown, extend upwardly through the ring 58 and are secured in the bearing block 53. The face of the protractor or degree scale 61 is viewed through an aperture 59 in the outer end of the arm 57, an index mark 60 being provided on the arm for alignment with the indicia of the protractor in setting the boom to any desired angle or in reading the boom angle, as will appear.

The sleeve 43 of the boom bears against and is supported by the top face of the block 53, these parts being formed with an interfitting connection such as depending lug 62 on the end of the sleeve 43 that is received in an axial recess in the upper end of the block 53. The parts are thus located in predetermined relative rotative positions so that the boom B is mounted in constant relation to the sweep indicator arm 57 of the protractor assembly. Both the bearing block 53 and the boom sleeve 43 are clamped to the post 42 to turn as a unit and to relieve the interfitting lug connection 62 of torque stresses. Suitable clamps may comprise radially projecting ears 63 formed on the block and on the sleeve and wing screws 64 received through the ears. Other locking means such as a transverse pin, indicated at 64, may be employed to locate and prevent relative turning of the parts. The post 42 thus turns in the column tube 1 when the boom is swung from one position to another.

An extension 65 is attached to the radial arm 57 of the protractor assembly as by means of bolts 106 and knurled nuts 107, the extension arm having a portion 108 underlying the platform 56 and including a ring 109 which embraces and turns on the cap member 51. In turning or adjusting the superstructure on the column 1, the extension 65 can be used as a lever or the operator can manipulate the boom directly. Since the extension is not essential to the functioning of the protractor, the former may be disconnected and removed if desired.

*Main vertical rod*

To obtain an instrument that is light and compact, to simplify storage and transportation, and yet one which can be expanded to measure the structures, clearances, ladings and similar relatively large objects associated with railways the rod R is made of a multiplicity of sections relatively slidable longitudinally one on another. Preferably the rod comprises main or outer tubular section 95, intermediate tubular sections 96, and inner or topmost tubular section 97 nested or telescoped one within another and which can be extended or retracted as desired. The upper end of each tubular section is split axially and taper threaded to receive a tapered screw type collar 76 by means of which the tube end can be contracted and caused tightly to grip the cylindrical surface of the tubular rod section embraced thereby.

Extending axially along each section of the rod is a scale 72 bearing indicia representing units and subdivisions of the measuring system employed. In the device illustrated the indicia represent feet, inches and fractions thereof. While the scales 72 may be inscribed directly on the surfaces of the tubular rod sections, they are conveniently formed or inscribed on separate metal tapes and the tapes secured flatwise against the bottoms of shallow axial channels milled longitudinally on the outer surfaces of the tubular rod sections. By adding the effective lengths of the several rod sections employed in any given set-up of the measuring device the total effective length of the rod is readily obtained.

In extending the rod it is convenient to withdraw the tubular sections from within one another by unit increments or multiples of the particular measuring system employed. To facilitate such a set-up and also to orient the several tubular rod sections in a single rotative position relative to one another the walls of the rod sections are formed with aligned apertures 91 (Fig. 14) that receive radial pins 88. These pins are of rectangular section and lock the tubular rod sections against both rotative and axial movement relative to one another. Each of the pins 88 is carried by a spring clamp 89 to which it is secured as by spot welding. The spring clamp is of generally cylindrical shape to closely embrace and substantially encircle the outer of the two tubes through which the pin is radially projected. Each pin includes a portion which projects radially from the tubular rod sections and which may be painted a distinctive color to serve as a visual indicator by means of which the pin can be readily located by the operator in figuring the effective length of the rod R when the latter is extended. The apertures 91 for the locking pins 88 are formed in the several tubular sections at uniform intervals, such as one-foot intervals, along the lengths of the sections. In extending or contacting the rod R by telescoping movement of its sections, the pins 88 or some of them being withdrawn for the purpose, the sections are readily adjusted in unit increments by aligning appropriately selected pairs of the apertures 91 in the walls of the tubular sections and inserting the pins 88 to lock the tubes in adjusted positions. The operator can quickly and readily determine by visual inspection the number of units of measurement between the several protruding pins and thus establish a basis for various measurements along the length of the rod. For example, the vertical distance between one of the horizontal arms and the index or gauge mark 75 in the aperture 73 of the boom sleeve is obtained by adding to the aggregate of the unit increments of the several extended sections of the rod between the arm and the boom the reading of the scale 72 as observed through the sleeve aperture 73, the reading of the scale representing the effective length of the main or outermost section 95 of the rod which is held in the boom sleeve 45.

The general set-up of the measuring machine with respect to the over-all length of the rod R and the placement thereon of the arms A' and A" is usually established and used without change for a series of measurements or a survey sequence. In the course of the measurements, however, it is often necessary to shift the rod R vertically in a bodily movement which also raises or lowers the arms A' and A" and the indicators I carried by these components. To facilitate such axial shifting of the vertical rod R a rack 66 (Fig. 11) is connected to the rod as by split clamping collar 67 that grips the rod in vertically spaced relation below the sleeve 45 on the outer end of the boom B.

The rack 66 extends upwardly through guide openings in a hollow metal casing 68 secured against one of the brace plates 46 of the boom. A gear 69 is housed within the casing 68 and is secured on the inner end of a shaft 70 turned by a crank 71 on the outer end of the shaft, the shaft being projected through the brace plate on the far side of the boom as viewed in Fig. 11. The gear 69 meshing with the teeth on the rack 66 acts to raise or lower the rod R, depending upon the direction the shaft 70 is turned by the crank 71. The position of adjustment is shown by the scale 72 recessed in an axial groove in the outer surface of the rod R, the scale being viewed through an opening 73 in the sleeve 45 and registered with a suitable index mark 75 which represents the level of the horizontal datum plane of the boom B. The rod is held as by a split clamp 74 on the upper end of the sleeve 45. By alternately releasing and engaging the clamps 67 and 74 the rack and gear may be used to shift the rod R progressively upwardly or downwardly. The rod may, of course, be shifted manually in the sleeve 45 by loosening both clamps, this being the procedure used in assembly.

A spring pressed lever 90 (Fig. 2) is pivotally mounted at 92 on one side of the boom sleeve 45 and carries on one end a pin 93 movable radially through an opening in the sleeve 45. The pin normally is held in engagement in one of a series of axial slots 94 formed in main or outermost tubular section 95 of the rod R. The engagement of the detent 93 in one of the elongated slots 94 resists relative turning of the tubular rod section 95 in the boom sleeve 45 and thus orients the rod in predetermined relation to the boom. By thus locating the rod in a single rotative position relative to the boom sleeve 45 the alignment of the scale 72 in the observation opening 73 is insured. The operator can readily determine by observation of the scale the vertical position of the outer section 95 of the rod R relative to the horizontal datum plane of the boom represented by the index mark 75. While the exact height of this datum plane is not critical, it is convenient to locate the index mark 75 at a nominal elevation of, say, two feet (24 inches) above the plane established by the top surfaces of the track rails 2 and 3. The datum plane of the swinging boom is thus established at a level which is an integral multiple of the basic unit of measurement, it being understood that the scale 72 on the rod R and the other scales on the arms and measuring components of the device are marked with indicia representing subdivisions such as inches, halves, quarters, eighths and sixteenths of the English measuring system employed. Should the metric system be used in lieu of the English system, it is contemplated, of course, to inscribe the scales with indicia representing centimeters and millimeters and to locate the index mark 75 which represents the horizontal datum plane of the boom at one meter or some other integral multiple of the centimeter unit above the plane of the top surfaces of the rails 2 and 3.

*Main horizontal arm*

The horizontal arm A' comprises a series (two or more) of nested or telescoped tubular sections 98 and 99 that provide for axial extensibility of the arm. Clamping collars 81 similar to the collars 76 of the rod R are screwed on the axially split ends of the tubes of the arm to provide for clamping together of the arm sections and retention of the indicators I, as will appear. A scale 77 bearing suitable indicia of length is recessed in a channel or groove formed in the side face of each tubular section of the arm, these scales permitting rapid determination of the total effective length of the arm. Preferably the scale indicia are arranged to indicate the distance along the length of the arm from the axis of rod R.

The outermost tube section 98 of the arm A' is larger in diameter than the uppermost or smallest tube 97 of the tubular sections comprising the vertical rod R, the arm section 98 being formed with a through opening 78 (Fig. 12) which receives the rod section. Triangular brace plates 79 are secured one on each side of the main tubular section of the arm A' and also to a tubular guide sleeve 80 which embraces the top tubular section of the rod R. Mounted on one of the brace plates 79 is a spring pressed lever 82, pivoted at 85, one end of which lever carries a retractable indexing pin 83 normally received and held in an opening in the tube 80 and engaged in a matching or complementally formed opening in the tubular section of the rod R to locate or orient the arm A' in predetermined rotative position on the rod. In such position the arm A' extends radially outwardly from the swing axis of the boom and is disposed in the plane of the boom and the rod to generate a horizontal plane paralleling and vertically spaced from the datum plane of the boom. To hold the arm and rod in such located position and to relieve the pin 83 of strain the lower end of the tube 80 is formed into a split clamp 86 which, by means of thumb screw 87, may be made to grip the upper section of the rod R.

Suitable locating and locking pins and aligned apertures similar to the pins 88 and the apertures 91 described in connection with the rod R are employed in the arm A' (and also in the supplemental arm A") to prevent relative turning of the telescoped tubes comprising the arm and to facilitate expansion and contraction of the arm in increments of length corresponding to units of the measuring system employed.

A supplemental vertical rod element or locator 100 surmounted by a visual signal indicator I is mounted on the main horizontal arm A' for horizontal sliding movement longitudinally of the latter. The vertical locator 100 comprises an upright cylindrical metal tube secured at its bottom end to a sleeve 101 which embraces the tubular arm A' and is slidable along the latter. The upright element 100 is rigidly secured to the sleeve 101 and triangular brace plates 102 are disposed across the angle between the rod and the sleeve, the plates being brazed or welded in place to maintain a right angle relationship between the rod and the sleeve. A split clamp 103 secured on one end of the sleeve 101 is tightened about the arm A' to retain the supplementtal vertical element in any desired position of adjustment along the length of the arm. An opening 104 in one side of the sleeve 101 exposes the scale on the arm A' and an index mark 105 inscribed on the sleeve adjacent the opening can be observed to determine the relative position of the rod on the arm. The indicator device I which surmounts the vertical tube 100 and which is described in connection with the arm A' has its indicator point 125 disposed on the vertical axis of the supplemental element, such axis coinciding with the index mark 105 so that the scale on the arm A' shows the horizontal spacing position of the indicator point relative to the vertical axis of the main vertical rod R.

The length of that portion of the uppermost section 97 of the rod R which projects above the arm A' is determined by the indexing pin 83 so that the dimension from the axis of the arm to the end of the point on the indicator I is a convenient fraction or integral multiple (say, 12 inches) of the measurement unit adopted for use in the device. Such dimension is added to the length of the rod portion between the arm and the datum plane index 75 on the boom in arriving at the vertical distance between the indicator top and the datum plane. Similarly, the length of the supplemental vertical rod 100 is selected so that the dimension from the arm axis to the tip of the indicator I on the rod 100 is a convenient fraction or integral multiple (say, 10 inches) of the measurement unit adopted.

The column 1 is braced by an adjustable length strut 135 the ends of which are pin connected at 136 to a collar 137 clamped or braced on the upper end of the column 1 and to a bracket 138 secured on the insulator 21 in the frame member 8. To support the boom B and relieve the column post 42 of strain when the apparatus is being set up or transported along a railway track a swingable strut 140 is connected to extend vertically between the carriage and the outer end of the boom. This strut comprises a pair of spaced parallel side members that are connected by cross elements to swing in unison on a pivot 141 carried by the main frame member 8 of the carriage. When not in use the strut 140 lies flat against and is supported on the frame member 8, being swingable to the vertical position shown in Fig. 1 when it is desired to provide support for the boom or superstructure. A transverse pin 142 in the boom structure is received in laterally opening recesses in the ends of the strut side members to provide hook connections that hold the parts together until the strut is manually removed or disconnected from the boom to be swung downwardly into its withdrawn position against the carriage frame member.

Secured on the top brace rod 47 of the boom and located adjacent the swing axis of the boom is a reel 145 containing a flexible cable 146 that connects to an eye 147 secured in a portion of the main horizontal arm A' which projects radially outwardly from the main rod R in a direction opposite to the main body of the arm A'. The reel 145 incorporates a conventional ratchet and pawl arrangement which permits the operator to tension the cord or cable 146 so as to draw the top of the rod R to the left as viewed in Figs. 1 and 15 or to the right as viewed in Figs. 14 and 15. The structure is thus adjusted to maintain the rod axis in a true vertical position by overcoming the deflection otherwise resulting from the off center weight of the main and auxiliary arms A' and A".

A plumb bob 150 suspended on a flexible cord 151 is provided as a visible indicator of the relative position of the main rod axis. The cord extends over a sheave or pulley 152 carried by the brace plates 79 of the main arm A', the cord being wound on a ratchet reel 152 mounted on the top tie rod 47 of the boom structure. The reel 152 permits the plumb bob to be raised and lowered in accordance with the height of the rod R as established by the number of sections that are extended so that the point or tip end of the plumb bob can be located in close proximity to a suitable index mark on the boom which represents the relationship of the parts when the rod R is in true vertical position.

In leveling the carriage and as a check on the positioning of the swing axis of the superstructure a spirit level 153 is mounted on the tubular member 44 of the boom. By observing the bubble in the level 153 as the superstructure is turned through a complete revolution the orientation of the swing axis is quickly determined and corrected by leveling adjustments of the screws 34 and 24 in the carriage.

*Visible signal indicators*

Figure 7:
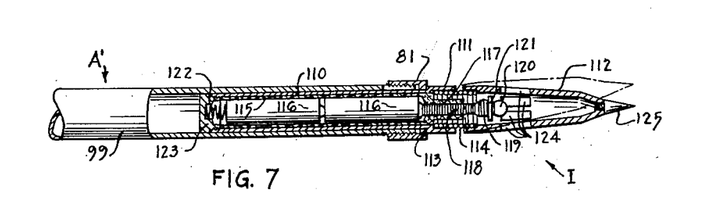
Fig. 7 is a sectional detail taken longitudinally through the end of one of the arms to show the construction of the electrical indicator.
Figure 8:
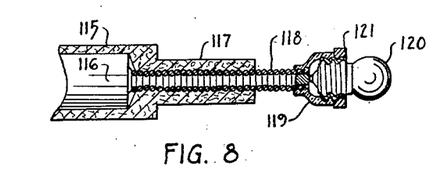
Fig. 8 is a fragmentary detail, partly in section and with parts broken away and removed, showing the lamp and the supporting socket for the lamp of the indicator device of Fig. 7, this view being enlarged with respect to Fig. 7.

Details of a suitable tip or indicator device I are shown in Figs. 7 and 8 in connection wtih the main horizontal arm A'. It is to be understood, however, that the visible signal indicators on the other arm or arms and rods are of the same construction, the several indicator devices being identical and interchangeable. Each indicator device comprises a tubular metal body 110 which is recessed into or received telescopically within the tubular end of the supporting arm or rod as the case may be. The arm or rod tube is axially split at its end, as previously mentioned, and carries one of the threaded clamping collars 76 or 81 by means of which the end of the arm or rod can be contracted about the body 110 of the indicator device to grip the latter. An enlarged end portion 111 on the outer end of the indicator body 110 has a circular radially disposed shoulder 113 that in assembly is placed against the outer end of the clamping collar 76 to locate the indicator device in predetermined axial relation to the arm or rod on which the indicator is mounted.

An axially elongated and tapered cage 112 of circular section is disposed in axial alignment with the tubular body 110 of the indicator and is connected yieldably to the latter by a helical coil spring 114 fitted loosely into axial counterbores in the confronting ends of the body and the cage and held by transverse pins. The spring constitutes the only connection between the parts, permitting the cage to be deflected laterally as indicated by the broken lines of Fig. 7. Within the tubular metal body 110 and insulated therefrom as by a tubular lining sleeve 115 of fiber or other nonconductive material are dry cell batteries 116. The insulating sleeve 115 is formed at one end with an integral or press fitted tubular extension 117 which projects through the outer end 111 of the indicator body. The insulating extension 117 is of less diameter than the interior of the connecting spring 114, providing an annular clearance space about the insulator which permits deformation of the spring in deflecting the cage portion 112 of the indicator from side to side.

Extending axially through the insulating extension 117 and supported by the latter on the axis of the indicator device is a helical coil wire spring 118 which makes electrical connection with the center terminal of one of the batteries. The outer end of the spring 118 supports a socket 119 of insulating material into which is screwed a lamp 120, the center contact of the lamp making electrical connection with the supporting spring 118. The insulating socket 119 which carries the lamp has a conductive collar 121 of brass or other metal which is electrically connected to the threaded contact portion of the lamp 120. Upon deflection of the indicator cage 112, say, to the broken line position of Fig. 7, the inside surface of the metal cage engages and makes electrical contact with the collar 121 to complete an electrical circuit through the lamp and the batteries. The metal case of the innermost battery is contacted by a conductive metal spring 122 carried by a metal plug 123 threaded into the inner end of the tubular battery case or body 110. Completion of the electrical circuit by contact between the collar 121 and the cage 112 upon relative lateral movement or deflection of the latter energizes the lamp 120 which shines or is visible through lateral openings 124 in the walls of the hollow cage. Excessive deflection of the cage 112 such as occurs when an indicator device encounters a rigid object merely results in bending of the lamp supporting spring 118 as well as the cage supporting spring 114, thereby avoiding permanent deformation or other damage to the indicator device. The cage 112 is desirably formed of aluminum or other light metal, the light-weight feature giving greater sensitivity than in the case of a cage of heavy metal. A pointed tip 125 of harder wear resistant metal such as steel is screwed into the end of the cage, the tip being on the longitudinal axis of the indicator device. The effective length of the indicator from the locating shoulder 113 to the end of the wear resisting tip 125 is six inches or other suitable fraction or multiple of the unit of measurement employed in the device and is added to the length of the rod or arm as determined by the scales 72 or 77 and by the spacing units between the locking pins 83, as the case may be, in determining the length of the rod or arm.

*Auxiliary horizontal arms*

In the measurement of certain types of clearances along a railway right of way it is convenient and desirable to utilize a number of horizontal arms on the main vertical rod R to eliminate resetting a single arm, the vertical rod, or both the arm and the rod. A suitable auxiliary arm is illustrated in the drawings at A", it being understood that several such auxiliary arms may be employed, as desired, the auxiliary arms being mounted, say on the several telescoping sections of the main vertical rod either above or below or both above and below the boom sleeve 45. Each such auxiliary arm comprises outer and inner telescoping tubes 130 and 131 respectively. One of the threaded clamping collars 81 on the split outer end of the tube 130 is actuatable to constrict the outer tube to grip the inner tube and to thereby hold the tubes in any desired position of relative longitudinal adjustment. A similar clamping collar on the outer end of the tube 131 grips an indicator I constructed as previously described in connection with Figs. 7 and 8.

At its inner or base end the outer tube 130 abuts a sleeve 132 that embraces and is slidable along one of the tubular sections of the main vertical rod R. The tube 130 and the sleeve 132 are secured together by brazing, the joint being reinforced by plates 133 brazed in place across the angle between the horizontal tube and the guide sleeve. A split clamp 134 formed or secured on sleeve 132 is adapted to grip the rod R, the clamp being releasable to permit vertical adjustment of the arm A" to different positions along the length of the particular rod section on which the auxiliary arm is mounted.

Figure 13:
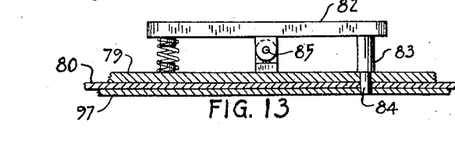
Fig. 13 is a fragmentary elevational detail taken substantially on the line 13—13 of Fig. 12 showing the indexing latch for orientating the horizontal arm on the vertical indicator rod.

The auxiliary arm (or arms) A" is removed and replaced by axial movement of the sleeve 132 over the end of the rod section concerned, the appropriate sections of the rod R being withdrawn one from another for the purpose and the appropriate locking collar 76 being removed to permit the withdrawal or replacement of the arm sleeve 132. A suitable locating device such as the spring pressed withdrawable detent pins 83 and 93 described in connection with the boom sleeve 45 in Figs. 2 and 3 and in connection with the arm A' in Figs. 12 and 13 is provided on the sleeve 132 of the auxiliary arm to be received in matching openings 139 in the tubular rod sections to locate or orient the arm in predetermined vertical and rotative relation to the rod R so that the auxiliary arm is disposed in the plane established by the axis of the column 1 and the boom B. The openings 139 formed in the walls of the tubular sections of the main vertical rod R for the locating pin detents of auxiliary arms A" are correspondingly located in each of the several main rod sections so that a plurality of auxiliary horizontal arms constructed as the arm A" described above are located by the withdrawable pin detents to extend from the main rod R in generally parallel relation to one another. Several auxiliary arms like the arm A" as well as the main horizontal arm A' may thus be disposed substantially in a common vertical plane which includes the axis of the main rod R and the swing axis of the boom and superstructure. This same plane contains all of the indicators I on the horizontal arms and all the indicators on the main rod R and the supplemental vertical element 100. Thus a single protractor assembly establishes the angular position of any one or all of a plurality of index points relative to the column or principal vertical axis of the device. Since the distance from such principal vertical axis to the tip of each of the indicators I is known or may be quickly ascertained or calculated from the known dimensions of the parts and by reference to the scales carried by the several rod and arm components, the normal or right angle distance of an obstruction or object contacting any of the indicators from the gauge face of one of the track rails or from any other suitable reference point such as the center line of the track can be quickly calculated or determined by reference to suitable geometric tables or curves prepared for use with the device.

*Dimensional characteristics and operation*

As previously mentioned, the swing axis of the superstructure is located through the center of the vertical column I and lies along the inner face or gauge of the track rail on which the carriage wheels 5 and 6 are supported. This location of the principal vertical axis with respect to which horizontal measurements are taken simplifies many of the clearance measurements and calculations encountered in charting a railway right of way. The instrument of the present invention is used in making trigonometric clearance measurements. By setting any of the indicators I at a known distance from the swing axis and then rotating the boom B until the tip of the indicator I comes in contact with an obstruction I, Fig. 6, the normal distance of the obstruction from the gauge face of the rail 2 can be quickly calculated by multiplying the distance from the indicator tip to the swing axis by the sine of the angle between the boom and the rail. Alternatively the measurement can be made by setting the superstructure boom B at any desired angle (including a right angle) to the rail 2 and extending one of the horizontal arms A' or A" until the indicator I on the arm contacts the obstruction. The normal distance between the obstruction and the rail is then obtained by a simple trigonometric calculation of the character described or from a chart or curve prepared in advance and keyed to the machine indicia. Similarly, the normal distance between the obstruction and the centerline of the track can be obtained from prepared curves or charts when the angle and the arm length are known.

Figures 5, 6:
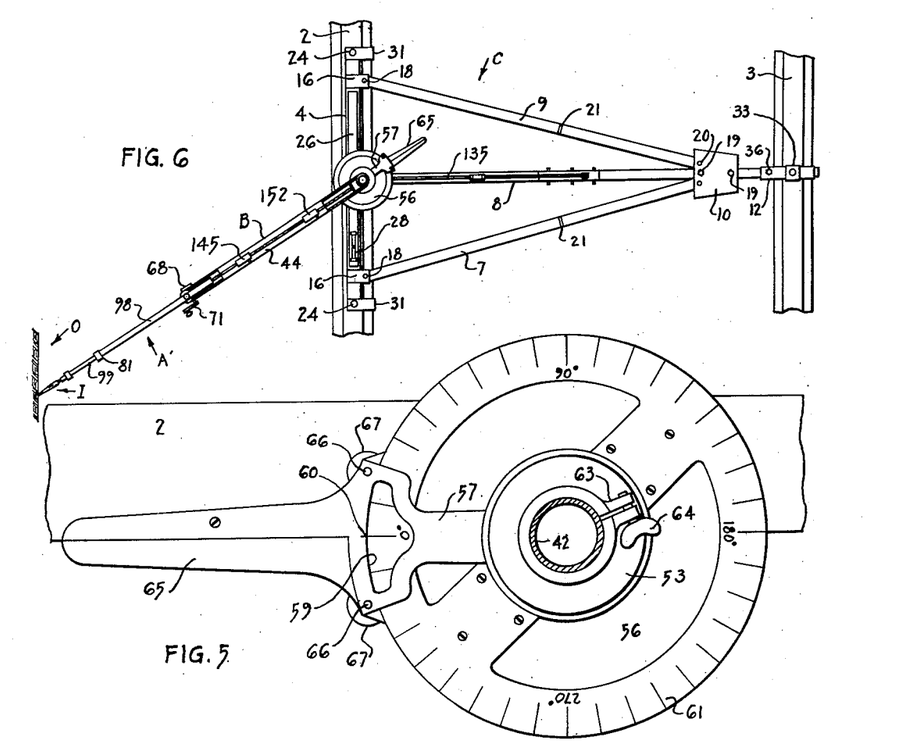
Fig. 5 is a plan view of the main column showing the protractor, this view being taken substantially along the line indicated at 5—5 of Fig. 4.
Fig. 6 is a plan view of the clearance device or measuring machine on a section of railway track showing the boom and arm extended at an acute angle to the rails of the track in suitable position for measuring right of way clearances.

It is thus clear that an important relationship exists between the protractor assembly and the track rail on which the carriage truck 4 is supported. It is convenient, for example, to have the protractor scale 61 oriented as shown in Fig. 5 so that the index mark 60 is at the 0° (or 360°) mark on the protractor when the boom B parallels the rail. To facilitate the checking of this relationship an indicator point or tip 155 is secured on the bottom of the rod R and projects axially downwardly therefrom. The tip comprises a pointed lower portion and an upper cylindrical tubular body or sleeve portion receivable over the lower end of the main or bottom section 95 of the tubular rod R in embracing relation to the latter. One of the threaded clamping collars 76 is screwed onto the split upper end of the tubular indicator body to contract the latter about the rod. By aligning the point on the indicator tip 155 with the gauge face of the rail 2, the boom being disposed in the general position shown in Fig. 15, it is apparent that the horizontal boom axis parallels the rail and, in fact, lies in the vertical plane of the rail gauge face. The protractor assembly is then inspected to insure that the zero mark of the scale 61 is aligned with the index mark 60, as shown in Fig. 5.

In measuring vertical clearances along the track centerline it is convenient to swing the boom B to a position over the track and normal to the rails. As a specialized feature of the present device the boom B has a length equal to half the standard gauge of railway tracks which locates the vertical axis of the rod R on the track centerline. The standard track gauge is 4 feet and 8½ inches as measured between the inner faces of the rails. The boom B is therefore 28¼ inches in length as measured between the main vertical swing axis at the column 1 and the vertical axis of the rod R. With such dimensional characteristic in the boom the superstructure is merely rotated to the 270° mark on the protractor scale 58 to position the vertical axis of the rod R on the track centerline. Vertical clearances on the track centerline are thus determined directly by measurements along the axis of the main rod R.

As a further refinement towards simplification of measurements the column 1 is of such height that in the normal level condition of the carriage C the index mark 75 in the opening 73 (by means of which the main rod scale 72 is observed) is normally 24 inches or 2 feet above the rail surface. By adding the 2 foot boom height to the effective length of the main rod R (or of the supplemental vertical element 100 in those instances where the latter is used) the operator quickly establishes total vertical height above the rail top.

Figure 15:
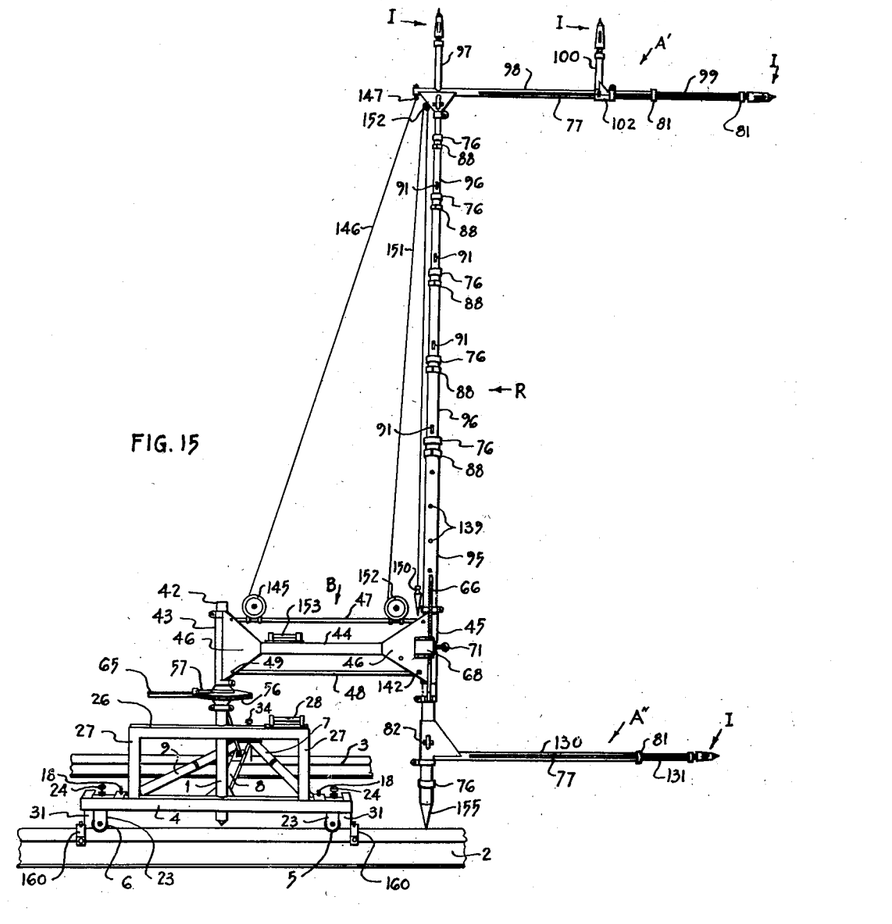
Fig. 15 is a perspective view of the clearance measuring machine or device showing stops locking the device in fixed relation on a railway track and also showing the position of the boom and related superstructure components when checking the boom and protractor in relation to the gauge of the track rail.
Figure 16:
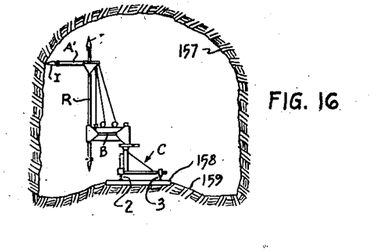
Fig. 16 is a diagrammatic view representing a transverse section of a railway tunnel to show the use of the present device in measuring and checking clearances.

Utilization of the device of the present invention in charting a railway tunnel or the like is illustrated in Fig. 16 wherein the cross-sectional outline of the tunnel is indicated diagrammatically at 157, the track rails 2 and 3 being secured to tie 158 resting on the usual ballast in tunnel floor 159. To obtain data for drawing the cross-sectional outline of the tunnel the carriage C of the clearance machine may be held at one point in the tunnel as by stops such as those illustrated at 160, Fig. 15, which are clamped to the rail 2 and engage the depending brackets 31 of the carriage to prevent rolling of the carriage along the track. The arm A' is adjusted by telescopic movement of its components to a suitable length and set at a suitable height by extension or contraction of the vertical rod R so that indicator I on the end of the arm comes into contact with the tunnel wall when the axis of the arm is at an acute angle to the track rail as explained in connection with Fig. 6. Contacting the tunnel wall by the tip 125 of the indicator I displaces the cage 112 to complete the circuit through the lamp 120 which thus provides the signal to indicate a reading is to be taken on the protractor scale 61. Knowing the effective length of the arm A from the swing axis of the superstructure and thus reading the angle at which the arm is disposed relative to the rail, the normal horizontal distance or abscissa of the selected point on the tunnel wall is readily obtained. The ordinate or vertical distance of the selected point above the rails is known by reason of the setting of the arm on the rod and the position of the rod in the boom sleeve 45 as shown by the scale 72 observed through the opening 73 in the boom sleeve.

Moving the arm A' to different vertical positions while the carriage is held in a single position on the track as by means of the stops 160 a series of readings can be taken from which the left-hand side wall contour as viewed in Fig. 16 can be plotted. To plot the contour of the right-hand side wall of Fig. 16 the device may be reversed on the track or the boom may be swung to overlie the carriage C, the arm A' being extended sufficiently to come into contact with the right-hand side wall. Points across the top of the tunnel and on the tunnel floor 159 are located and plotted by using the index I on the upper end of the rod R and the indicator tip 155 on the bottom end of the rod. In certain instances it is convenient to swing the arm A' to one side when taking readings with the indicator I on the rod R or to remove the arm from the rod. The supplemental vertical rod or element 100 is also used in locating and measuring points on the ceiling of the tunnel, the supplemental element being moved along the arm A' to whatever position brings the tip of the indicator I thereon into engagement with the particular point on the tunnel ceiling that is being plotted.

To survey a tunnel for a particular clearance problem as when making a decision as to the possibility of transporting a particular lading through the tunnel the carriage C is set up on a horizontal portion of the tunnel track. The rod R and the arms A' and A" with one or more of the supplemental vertical elements 100 mounted on the upper arm are positioned so that the tips of the indicators I on the several rods and arms represent critical points or protuberances on the lading in question plus the desired safety factor and any allowance for car swing. The boom B is set so that the arms are disposed at a convenient angle such as 60° to the track rail. In this pre-set condition the measuring device is traversed through the tunnel. Several passes may be made, or all critical points can be checked in a single pass. If none of the indicators I come in contact with the tunnel walls it is established that the lading in question will pass safely through the tunnel. Since the device is set up on a level portion of the tunnel track and the superstructure of the instrument is maintained in fixed relation to the carriage C even though the latter may become tilted as it travels on a grade or about a banked turn, the indicators I represent the true relationship of the critical lading points as the latter are moved through the tunnel by a railway car.

Figure 17:
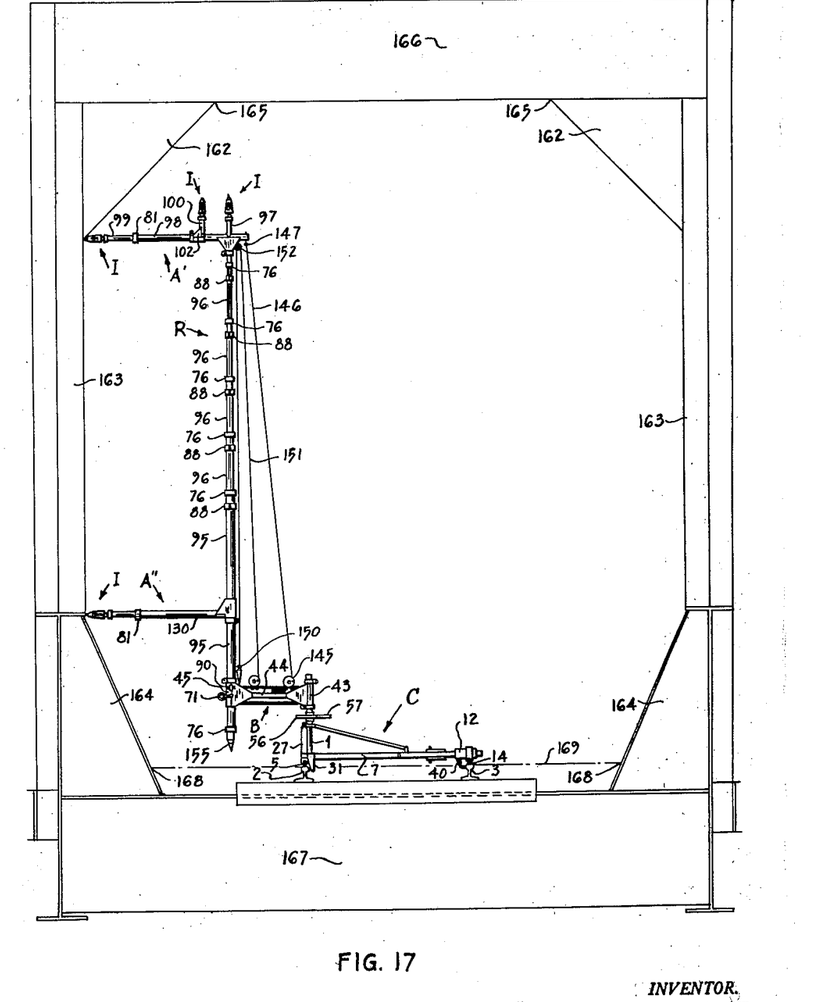
Fig. 17 is an elevational view, partly diagrammatic, representing a railway bridge section to show the use of the device of the present invention in measuring clearances.

Fig. 17 illustrates the use of the present device in checking clearances of a railway structure such as a bridge and a bridge approach. The carriage C is set up on a level portion of the track and the arms A' and A" are arranged by length adjustment and by vertical adjustment of the rod R to swing in vertically spaced horizontal planes that are intersected by critical points of the structure. The indicators I on the ends of the arms are set normally to make simultaneous contact with a plurality of the critical points. As shown, for example, in the figure referred to, the indicator I on the arm A' engages the point representing the intersection of the edge of a diagonal bridge brace 162 with the inside face of a bridge column 163. The indicator I on the other or lower arm A″ is set, as by suitable adjustment of the length and height of the arm to contact the point representing the intersection of the flange of a lower diagonal brace 163 with one of the bridge columns 163.

With the arms A′ and A″ set in the positions illustrated in Fig. 17 the measuring device is traversed through the bridge and protractor readings are taken at each of the columns having the braces 162 and 164 associated therewith. Discrepancies and variations in the bridge structure or in the location of the track rails are quickly recognized by irregularities in the protractor readings or by lack of horizontal registry of the arms with the critical bridge points being surveyed. The exact location of any irregular point is quickly obtained, however, by axial shift of the rod R using the crank 71.

In checking the critical points of the bridge or other railway structure the arms A′ and A″ are adjusted in length so that the boom and the arms are disposed at an acute angle to the track rail when contact is made between the indicator I on the end of the arm and the critical point of the structure, it being desirable to take a series of readings on similar critical points without altering the lengths of the arms, any discrepancies or variations being accommodated by alteration in the angle between the arms and the track rail at contact.

To measure critical points on the right-hand side of the bridge, as viewed in Fig. 17, the carriage C of the measuring instrument is either reversed on the track or the boom B is swung to a position overlying the carriage and the horizontal arms of the device are suitably extended. A satisfactory procedue is to set up the instrument or clearance machine substantially as illustrated and to then traverse the full length of the bridge making readings on the left side. Without substantially changing the setting of the arms and the rod of the clearance machine the carriage C is then reversed on the track and returned across the bridge, making the measurements on the other side of the bridge during the return trip.

In a similar manner other critical points such as the intersections 165 of the diagonal braces 162 with cross beams 166 are checked by using the indicator I on either the upper end of the rod R or the supplemental vertical rod 100. All of the points along one side of the bridge structure and corresponding to the points indicated at 165 are checked during movement of the clearance machine across the bridge in one direction, similar points on the opposite side of the bridge being checked on the return trip of the clearance machine.

To check or locate any points that are to be investigated, as, for example, intersection points 168 of the knee or diagonal braces 164 with horizontal plane 169 of the top of the rails, use is made of the indicator I on the arm A″. Measurements can also be obtained by mounting one of the supplemental vertical elements 100 in a downwardly directed direction on the auxiliary arm A″, the latter being received on the rod R below the boom B. This location of the supplemental arm A″ is shown in Figs. 1 and 15.

Figure 18:
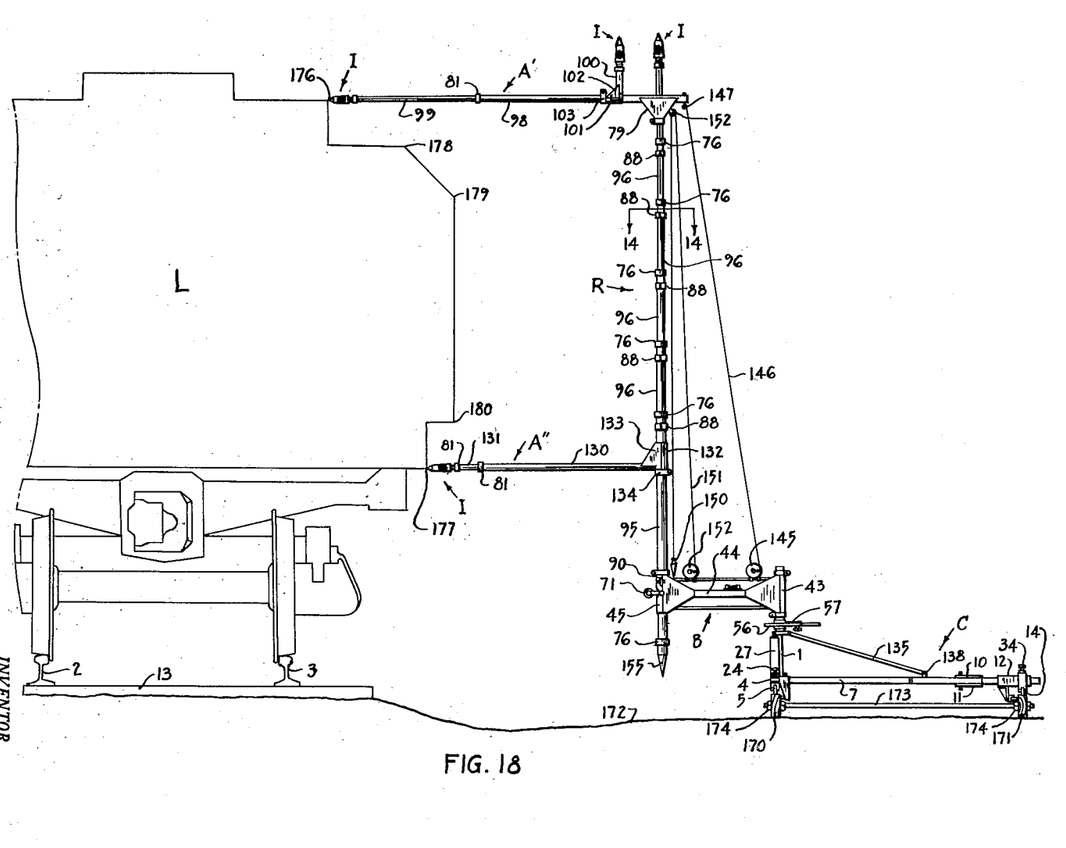
Fig. 18 is an elevational view, partly diagrammatic, representing the use of the present device in measuring a railway lading from an auxiliary track or platform.

The present clearance machine can be set up on a floor, dock, pavement or platform to measure various objects, the carriage being leveled by means of the screws 24 and 34 and suitable blocks being used to hold the carriage in fixed location. In Fig. 18 the clearance machine is shown set up on the ground adjacent a railway track. The wheels 5, 6 and 14 of the carriage are supported on a mock track comprising dummy rails 170 and 171 supported directly on the surface of the ground, indicated at 172. The dummy rails may comprise wooden 2 x 4's connected by metal tie rods, one of which is indicated at 173. The ends of the tie rods are threaded to receive nuts 174 that embrace the 2 x 4 rails, the rods and the nuts locating the dummy rails in spaced parallel relation corresponding to the spacing of the rails 2 and 3 of the railway track. The wooden rails and the metal tie bars constituting the mock or dummy track section can be taken apart readily for compact packaging so that it can be carried from one place to another and quickly assembled for use as a temporary carriage support as needed.

In one use of the device, set up on a mock or dummy track similarly to the arrangement illustrated in Fig. 18, measurements are taken of critical points or corners of a lading L carried by a conventional flat car riding on the rails 2 and 3. The position of the measuring device relative to the track rails is determined in a preliminary operation by conventional methods or by swinging the boom B so that the indicator I on one of the arms or on a depending auxiliary vertical element carried by one of the arms is aligned with the inner or gauge face of one of the track rails. With the position of the swing axis of the boom B relative to the centerline of the track thus determined, the car carrying the lading L is brought opposite the clearance measuring device. Using either the arm A′ or the arm A″, the locations and relative heights of critical lading points such as points 176–180 are determined by the measuring procedure previously described. Although the arms A′ and A″ are both in use in Fig. 18, their respective indicators I being in contact with selected lading points, it is to be understood that in the measurement and location of the several lading points the arms are used one at a time, the unused arm being rotated or shifted on the rod R to an inactive or retracted position.

In this measurement of the lading points, determination is made of the distances between such points and the swing axis of the boom B in a plane normal to the main track. These distances, however, enable the operator to determine the horizontal distances from the respective lading points to the centerline of the main track. Since the distance from the swing axis of the boom to the centerline of the main track is known, the desired horizontal distances between the track centerline and the critical points in question are the complements of the distances between such points and the swing axis of the boom as measured in accordance with the procedure outlined.

In the measurement of an unknown lading in the manner just described it is unnecessary to determine the height of the mock or dummy track relative to the main track. Since the height of the car platform is known, the heights of the critical points of the lading relative to one another supply the data from which the distances of the critical lading points above the plane of the tops of the track rails can be determined.

Another use of the mock or dummy track set-up, illustrated in Fig. 18, is in the checking of a number of similar or identical ladings on a car or series of cars. In such multiple lading checking, the measuring instrument or device of the present invention may be employed as a right angle machine in which the plane of the boom B and the arms A′ and A″ is normal or at a right angle to the centerline of the main track.

The arms A′ and A″ are extended and adjusted in height on the rod R so that the indicators I on the arm ends are located to contact critical points such as corners 176 and 177 of a lading L carried by a flat conventional car on the rails 2 and 3 of the railway track. The arms of the clearance machine are preferably set so that several of the indicators I contact the critical corners of the lading substantially simultaneously. Such arrangement permits a single set-up of the clearance machine to check a number of ladings on a single railway flat car as the car is moved slowly past the checking station where the clearance machine is located. Similarly, the one set-up of the clearance machine can be employed to check identical ladings on a series of railway cars as the latter move past the clearance checking station. Although a single pair of arms is shown in the set-up of Fig. 18, it is apparent that additional arms corresponding to the arm A″ can be mounted on the rod R in vertically spaced relation to check other critical points of the lading, such as the points indicated at 178, 179 and 180. All of the arms are located as by the detent devices associated with the spring pressed arms 82 in a common plane which is the plane defined by the rod R and the swing axis of the boom B.

In accordance with the patent statutes the principles of the present invention may be utilized in various ways, numerous modifications and alterations being contemplated, substitution of parts and changes in construction being resorted to as desired, it being understood that the embodiment shown in the drawings and described above and the particular method set forth are given merely for purposes of explanation and illustration without intending to limit the scope of the claims to the specific details disclosed.

I claim:

1. A railway clearance measuring device comprising a carriage having wheels for supporting and locating the carriage on a railway track in predetermined position, a boom mounted on the carriage to swing about an upright axis, a protractor centered on the swing axis to show the relative position of the boom on the carriage, an elongated indicator rod, means mounting the rod on the boom with the rod axis in spaced generally parallel relation to the swing axis and for relative axial shifting of the rod while maintaining said parallel relation, the rod being swingable with the boom to generate a substantially cylindrical surface centered at the swing axis, an arm carried by the rod in vertically spaced relation to the boom, means indexing the arm on the rod to locate the arm with its longitudinal axis in substantially parallel relation to the longitudinal axis of the boom, and indicia on the boom and rod showing the vertical spacing of the arm relative to the boom.

2. A railway clearance measuring device comprising a carriage having wheels for supporting and locating the carriage on a railway track in predetermined position, a boom mounted on the carriage to swing about an upright axis, means for leveling the carriage to orient the swing axis vertically, an elongated indicator rod, means mounting the rod on the boom to swing therewith, said rod being disposed with its axis in spaced generally parallel relation to the swing axis of the boom to generate a cylindrical surface having its vertical axis at the said rail gauge, an arm extending laterally from the rod in vertically spaced relation to the boom, said arm being wholly supported by the rod as a cantilever, and adjustable tension means connected between the boom and the rod and across the angle therebetween to compensate for stress caused in the rod by the cantilever arm.

3. A railway clearance measuring device comprising a carriage having wheels for supporting and locating the carriage on a railway track in predetermined position, a column on the carriage, a boom supported on the column to swing about a vertical axis substantially at the gauge of one of the rails of a supporting track, an indicator rod comprising a plurality of telescoped tubes slidable one within another to adjust the length of the rod, means for locking the tubes to hold the rod in adjusted position, means on the boom embracing the rod in relative sliding relation and locating the rod with the rod axis in spaced generally parallel relation to the swing axis, adjusting means connected between the boom and the rod, said adjusting means being actuatable to shift the rod axially relative to the boom, the rod being swingable with the boom to generate a substantially cylindrical surface centered at the swing axis, and a cantilever arm secured to and extending laterally from the rod for parallel motion shifting movement upon axial shifting of the rod, the cantilever arm being spaced vertically from the plane generated by the swinging boom.

References Cited in the file of this patent

UNITED STATES PATENTS

| 397,286 | Hansel | Feb. 5, 1889 |
|---|---|---|
| 449,920 | Thom | Apr. 7, 1891 |
| 503,238 | Howell | Aug. 15, 1893 |
| 667,516 | Gibboney, Jr. | Feb. 5, 1901 |
| 953,490 | Roughen | Mar. 29, 1910 |
| 1,175,617 | De Vries | Mar. 14, 1916 |
| 1,784,160 | Remond | Dec. 9, 1930 |
| 1,887,437 | Schotthoefer | Nov. 8, 1932 |
| 1,936,828 | Clement | Mar. 28, 1933 |
| 2,189,585 | King | Feb. 6, 1940 |
| 2,361,462 | Dickinson | Oct. 31, 1944 |
| 2,478,081 | Beets | Aug. 2, 1949 |
| 2,511,392 | Worel | June 13, 1950 |

FOREIGN PATENTS

| 330,504 | Italy | Oct. 16, 1935 |